(12) United States Patent
Schiebeler et al.

(10) Patent No.: US 9,373,093 B2
(45) Date of Patent: Jun. 21, 2016

(54) GATEWAY SERVICE MANAGER FOR BUSINESS OBJECT APPLICATIONS

(71) Applicants: Dirk Schiebeler, Eppingen (DE); Jan Rumig, Malsch (DE)

(72) Inventors: Dirk Schiebeler, Eppingen (DE); Jan Rumig, Malsch (DE)

(73) Assignee: SAP SE, Walldorf (DE)

(*) Notice: Subject to any disclaimer, the term of this patent is extended or adjusted under 35 U.S.C. 154(b) by 328 days.

(21) Appl. No.: 14/074,520

(22) Filed: Nov. 7, 2013

(65) Prior Publication Data

US 2015/0127785 A1 May 7, 2015

(51) Int. Cl.
*H04L 12/24* (2006.01)
*G06Q 10/04* (2012.01)
*G06Q 10/06* (2012.01)

(52) U.S. Cl.
CPC ............... *G06Q 10/04* (2013.01); *G06Q 10/06* (2013.01); *H04L 41/24* (2013.01)

(58) Field of Classification Search
CPC ..................... H04L 41/0816; H04L 41/0803
USPC ........................................................ 709/220
See application file for complete search history.

(56) References Cited

U.S. PATENT DOCUMENTS

| 6,106,569 | A | 8/2000 | Bohrer et al. | |
|---|---|---|---|---|
| 6,128,611 | A | 10/2000 | Doan et al. | |
| 6,442,748 | B1 | 8/2002 | Bowman-Amuah | |
| 6,529,909 | B1 | 3/2003 | Bowman-Amuah | |
| 6,539,396 | B1 | 3/2003 | Bowman-Amuah | |
| 7,546,351 | B1* | 6/2009 | Horstmann | G06Q 10/107 709/206 |
| 7,676,816 | B2 | 3/2010 | Brunswig et al. | |
| 8,055,523 | B2 | 11/2011 | Finke et al. | |
| 8,566,358 | B2 | 10/2013 | Lane et al. | |
| 2003/0018887 | A1* | 1/2003 | Fishman | H04L 29/06 713/151 |
| 2004/0213409 | A1* | 10/2004 | Murto | G06F 17/3087 380/258 |
| 2009/0144252 | A1 | 6/2009 | Koch et al. | |
| 2011/0295646 | A1 | 12/2011 | Barros | |
| 2012/0254431 | A1 | 10/2012 | Kylau et al. | |
| 2013/0151317 | A1* | 6/2013 | Charfi | G06Q 30/0241 705/7.36 |
| 2013/0151571 | A1* | 6/2013 | Stumpf | G06F 17/30427 707/805 |
| 2013/0151655 | A1* | 6/2013 | Wu | H04L 67/2823 709/217 |
| 2014/0006368 | A1* | 1/2014 | Moser | G06F 17/30386 707/705 |
| 2014/0019934 | A1 | 1/2014 | Schlarb et al. | |
| 2014/0075350 | A1* | 3/2014 | Gauthier | G06Q 10/109 715/765 |
| 2014/0279839 | A1 | 9/2014 | Balzar et al. | |
| 2014/0344325 | A1* | 11/2014 | Moser | H04L 67/2842 709/203 |

* cited by examiner

*Primary Examiner* — Hee Soo Kim
*Assistant Examiner* — Elizabeth Kassa
(74) *Attorney, Agent, or Firm* — Schwegman Lundberg & Woessner, P.A.

(57) ABSTRACT

A system includes a backend server with business applications within a business object processing framework. The business object processing framework includes a framework data format. The system also includes a generic gateway service manager coupled to the business object processing framework, and a gateway coupled to the generic gateway service manager. The gateway includes a gateway data format, and the generic gateway service manager is positioned between the business object processing framework and the gateway. The generic gateway service manager is configured to retrieve the framework data format from the business object processing format and store the framework data format in the gateway. The gateway is configured to transfer data between the business object processing framework and a user interface using the framework data format stored in the gateway.

14 Claims, 7 Drawing Sheets

| TY | PARAMETER | TYPE SPEC. | DESCRIPTION |
|---|---|---|---|
| ⬜ | IV_ENTITY_NAME | TYPE STRING | |
| ⬜ | IV_ENTITY_SET_NAME | TYPE STRING | |
| ⬜ | IV_SOURCE_NAME | TYPE STRING | |
| ⬜ | IT_FILTER_SELECT_OPTIONS | TYPE /IWBEP/T_MGW_SELECT_OPTION | TABLE OF SELECT OPTIONS |
| ⬜ | IS_PAGING | TYPE /IWBEP/S_MGW_PAGING | PAGING STRUCTURE |
| ⬜ | IT_KEY_TAB | TYPE /IWBEP/T_MGW_NAME_VALUE_PAIR | TABLE FOR NAME VALUE PAIRS |
| ⬜ | IT_NAVIGATION_PATH | TYPE /IWBEP/T_MGW_NAVIGATION_PATH | TABLE OF NAVIGATION PATHS |
| ⬜ | IT_ORDER | TYPE /IWBEP/T_MGW_SORTING_ORDER | THE SORTING ORDER |
| ⬜ | IV_FILTER_STRING | TYPE STRING | TABLE FOR NAME VALUE PAIRS |
| ⬜ | IV_SEARCH_STRING | TYPE STRING | |
| ⬜ | IO_TECH_REQUEST_CONTEXT | TYPE REF TO /IWBEP/IF_MGW_REQ_ENTITYSET | OPTIONAL |
| ⬛▸ | ET_ENTITYSET | TYPE /SCMTMS/CL_TENDERING_MPC=>TT_STOP | RETURNING DATA |
| ⬛▸ | ES_RESPONSE_CONTEXT | TYPE /IWBEP/IF_MGW_APPL_SRV_RUNTIME=>TY_S_MGW_RESPONSE_CONTEXT | |

GATEWAY SERVICE MANAGER FOR BUSINESS OBJECT APPLICATIONS

TECHNICAL FIELD

The present disclosure relates to a gateway service manager for business object applications.

BACKGROUND

In many circumstances, when implementing a gateway service, one has to complete the implementation of pre-generated backend server methods with application specific business logic to retrieve data from the backend server, to process the data (create, update, delete), and/or to execute function imports (actions). In many situations, the backend server includes a business object processing framework (BOPF), which is a central programming framework in some systems. An application that is based on a BOPF describes the world with business objects (BO) having numerous associations and links between each other, which are used for the communication between the business objects. In this manner, the business processes are realized. The BOPF allows the modeling and implementing of business applications following strict rules.

BRIEF DESCRIPTION OF THE DRAWINGS

FIG. 3 is an example of an interface for a gateway service.

DETAILED DESCRIPTION

Figure 1:
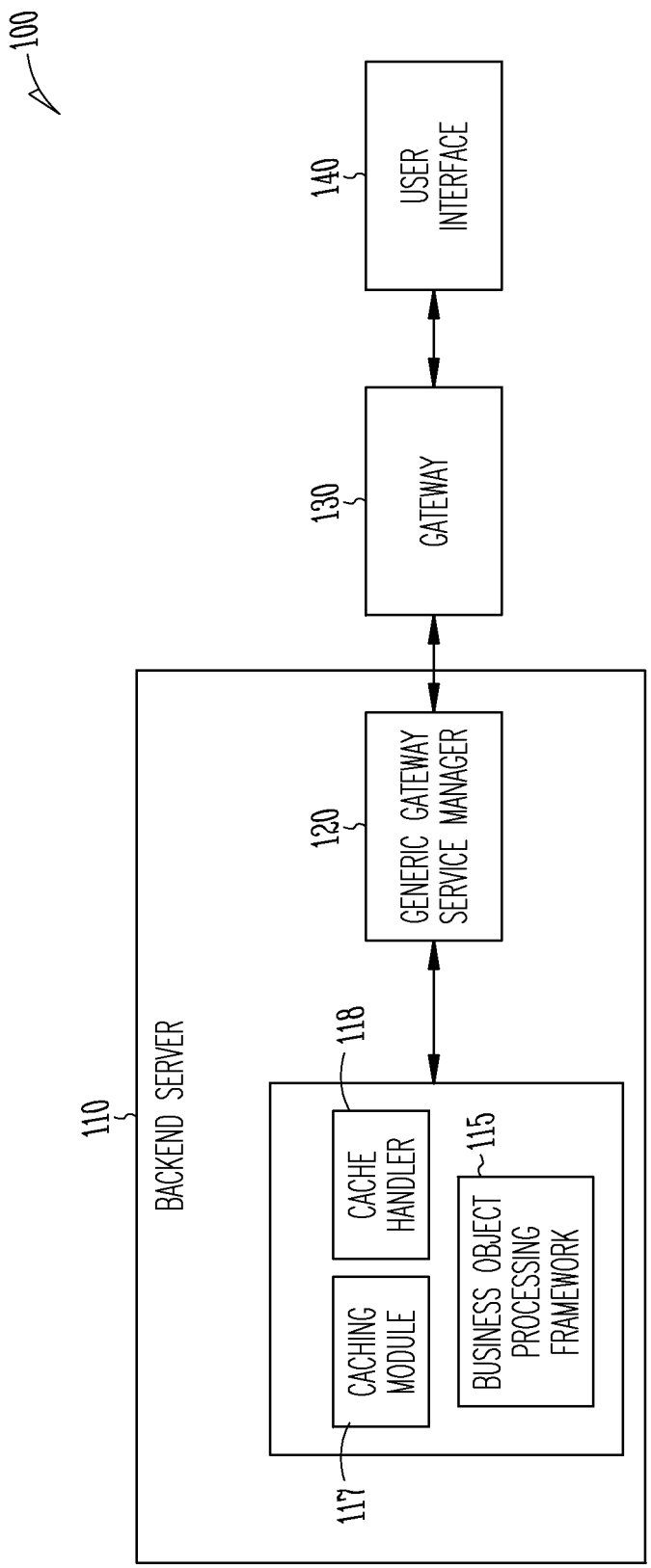
FIG. 1 is a block diagram of a gateway-server system that includes a generic gateway service manager.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

When developing gateway services for applications based on a business object processing framework (BOPF), there are always the same problems and tasks to be taken into account, especially in the context of data retrieval. For example, there is a need for single data access with correct data key mapping from the gateway representation into the BOPF representation, and correct data mapping from the BOPF representation into the gateway data format. There is also a need for mass data access with correct mapping (same as for single data access), plus support of paging, filtering (via string or select options), sorting, searching (via string), and navigation between several gateway entities. There is further a need for function import with correct mapping from the gateway representation into the BOPF representation (so called action) and back into the gateway function import. There is yet further a need to create, update, and delete with a correct translation into BOPF create, update, and delete calls.

When starting to develop a new business object, for example, to describe a new part of a particular system, a modeling tool can be used. Such a modeling tool can be implemented via a configuration user interface. Development therefore starts with some modeling activities, wherein the skeleton of the business object is defined (e.g., nodes, node attributes, and relationships between the business object nodes). This meta-model information can be used at runtime to solve tasks generically and independently from one single business object.

In an embodiment, the strict structure of a business object processing format assists in an implementation of a simplified gateway service. A BOPF is a model-driven approach and infrastructure that is used for developing business objects. The BOPF is an object-oriented framework that provides a set of generic services and functionalities to speed up, standardize, and modularize system development. The BOPF manages the entire life cycle of business objects and covers all aspects of business application development. Instead of expending effort for developing an application infrastructure, a developer can focus on the individual business logic. The BOPF allows the building of applications on a stable and customer-proved infrastructure. A particular example of a BOPF is used and available from SAP®.

Business objects are the basic units of a BOPF-based programming model. Business applications or processes operate on certain business objects. A business object is represented as a hierarchical tree of nodes. A single node includes a set of semantically related business object data and the corresponding business logic. On the technical level, each node is implemented with a regular dictionary table, where each node instance corresponds to a single table entry (table rows). Nodes and attributes set up the data part of a business object. Again, from a technical viewpoint, attributes form the columns of the table. A node serves as an anchor point for connecting the business logic of the business object.

In gateway-backend systems, it is often necessary to map data from the gateway format into the BOPF data format. In an embodiment, this mapping is executed generically. In fact, it is possible to reduce the efforts of implementation for the data access via the BOPF (since skilled developers are well-acquainted with the BOPF). A generic gateway services manager dynamically instantiates data access classes to load data in the gateway data format from the BOPF backend. The interface of the data access classes is defined in a way that BOPF developers can work with known data structures of the BOPF environment that they already know. This makes it quite easy to implement these classes.

In an embodiment then, a central idea is to have one generic layer between the BOPF backend and the gateway service. The generic layer handles the following aspects of a gateway service for a BOPF-based backend. The generic layer handles correct business data mapping between the gateway service and the BOPF backend. It does so by using the gateway and BOPF model information, which is always available via these frameworks. The generic layer also correctly handles sorting options, filtering options, searching (search string), and paging options. The generic layer further supports function imports and translation into BOPF actions, and supports data modification such as creating, updating, and deleting.

With such a generic layer, one can avoid typical mistakes of other gateway service implementations, guarantee similar behavior and interpretation of the gateway service interfaces, and reduce training and learning efforts for developers having to implement gateway services for BOPF-based applications. Also, it is guaranteed that standard functionality like sorting, searching, or filtering is implemented correctly and working out of the box. By separating the implementation of the data access from the gateway service implementation, a reuse of this data access is possible. Additionally, extensions like data caching mechanisms can be implemented and easily added in a generic way.

FIG. 1 is a block diagram of a gateway-server system 100 that includes a generic gateway service manager 120. The system 100 includes a backend server 110 with a business object processing framework (BOPF) 115. The backend server 110 further includes a caching module 117 and a cache handler 118. The business object processing framework has a framework data format. A user can access data in the backend server 110 via a user interface 140. The communication between the user interface 140 and the backend server 110 is through a gateway 130 and the generic gateway service manager 120. The gateway 130 has a gateway data format. As illustrated in FIG. 1, the generic gateway service manager 120 is positioned between the business object processing framework 115 and the gateway 130. The gateway 130 pulls data that is requested by customers, users, and clients out of the backend server 110. The gateway 130 also triggers actions in the backend server 110. The gateway service manager 120 implements several services. Specifically, a gateway service covers several entities, which can be seen as a kind of node of a business object. Like business object nodes, a gateway service entity also contains attributes, called properties, and there can be relationships between the entities of a gateway service.

Figure 2:
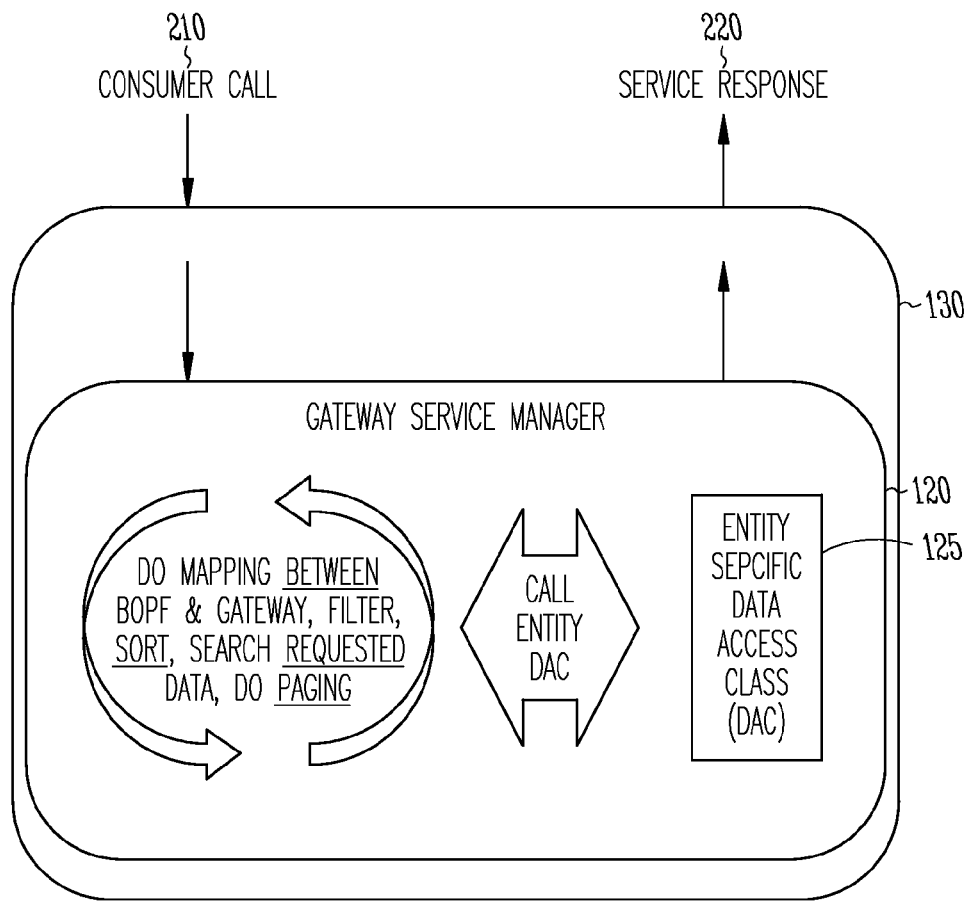
FIG. 2 is a block diagram of a gateway and a gateway service manager.

FIG. 2 is a block diagram of the gateway 130 and the gateway service manager 120. In general, as illustrated in FIG. 2, a user request arrives into the gateway at 210. The request is processed by the gateway service manager 120. This processing can include mapping between the BOPF and the gateway. The processing can further include filtering, sorting, searching, and paging functions on the requested data. The gateway service manager 120 can include entity specific data access class modules 125, which access the data or requested entity in the backend server 110. The requested entity retrieved from the backend server 110 is transmitted back to the user at 220. In short, the gateway service manager 120 executes the whole mapping between the BOPF 115 and the gateway 130, as well as the correct processing of the different, possible settings via the gateway service.

The call from the user at 210 is delegated to the gateway service manager 120, which maps the requested data into a BOPF conformed data format, calling the entity specific data access class module 125. In the best case, the query already exists and is just reused for the gateway service. If there is no query in the business object available, it is newly developed. This can be done by any developer who is familiar with the BOPF. The entity specific data access class module 125 also has to be implemented by the service developer. However, its development is based on the BOPF, which developers familiar with the system 100 know very well as compared to the gateway 130, which developers do not know very well or at all. Therefore, the implementation of the entity specific data access class module 125 is also quite easy. It is just executing a query of the business object which is working as a basis for the gateway service entity. The gateway service manager 120 further retrieves the data or requested entity from the backend server 110, maps the retrieved data back into the gateway format, and executes the services requested by the user such as sorting, paging, searching, and/or filtering before returning the data back to the gateway 130, which delivers it to the consumer at user interface 140.

To implement a gateway service in the system 100, one begins by defining service entities with their properties, and by defining navigation properties that build the relationships between the entities. Out of this model information, one generates a service template, which contains all the statically modeled information.

FIG. 3 is an example of an interface for a gateway service. The interface includes the request data from a consumer user interface, translated by the gateway 130 into the gateway data format. As can be seen in FIG. 3, the interface can include such fields as entity name, entity set name, source name (i.e., source of the entity), filter options, paging structures, navigation paths in the system, sorting orders, filter strings, and search strings. The translation in the gateway 130 depends in part on service meta data. A developer takes all of the input into account to determine the requested entity set results. The generic gateway service manager 120 executes this function generically, leaving just the data retrieval from the backend server 110 via the BOPF 115 for the developer's consideration.

A user can request the following services using the gateway, generic gateway manager, and the backend server. The user can simply request all available data. The user can request that the data be filtered (using filter criteria from the filter options). The filter options can be used by the service implementation. The filer options are derived from the user interface request by the gateway. The user interface can provide as filter options any values for the properties of an entity that are marked as filterable. The user can supply paging options when requesting the entity. For example, the user can request only the first 500 records, or the user can request the top 20 records based on some criteria (e.g., filter options, sorting options, search terms, and paging options (e.g., skip 200 records and return the next 20 records)). The user can provide a key that is used to locate records. The user can request a combination of entities using a navigation property. The user can further request data that is sorted by some given property values (e.g., in ascending or descending order). The sort feature works hand-in-hand with the paging option.

In the system 100 then, the plurality of entities looks exactly the same (with different queries being executed). There is therefore not much room for bugs, and maintenance and support are possible with no or reduced knowledge about the gateway 130. Additionally, new features can be introduced easily in the generic parts of the gateway service manager 120, which are consequently valid for all currently existing implementations.

For users and customers this means that they are getting the whole functionality for all entities of the existing gateway services, and they are all working exactly the same way, are extensible, and provide the general services like sorting, searching, filtering or paging, with minimized memory consumption and optimized runtime.

Figure 4A:
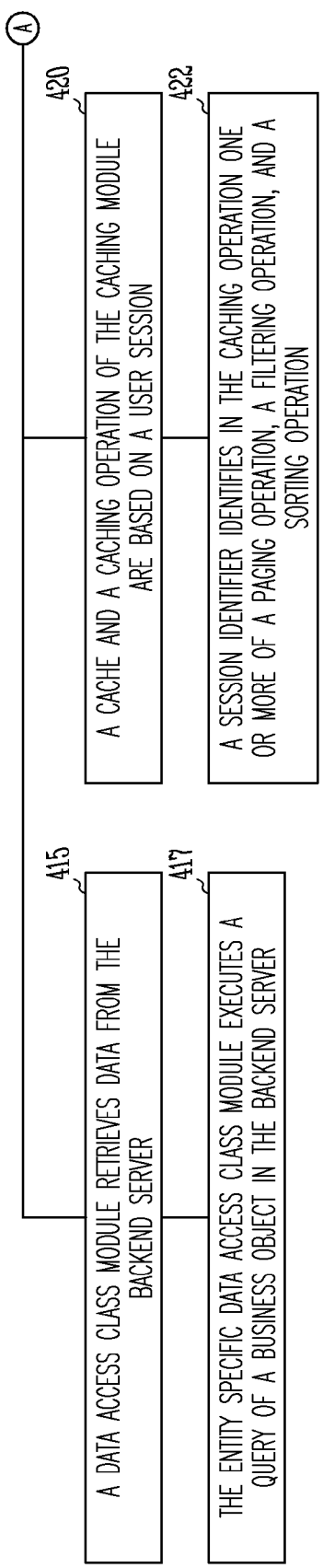
FIGS. 4A, 4B, and 4C are a block diagram illustrating operations and features of a system with a gateway service manager for use with business object applications.
Figure 4B:
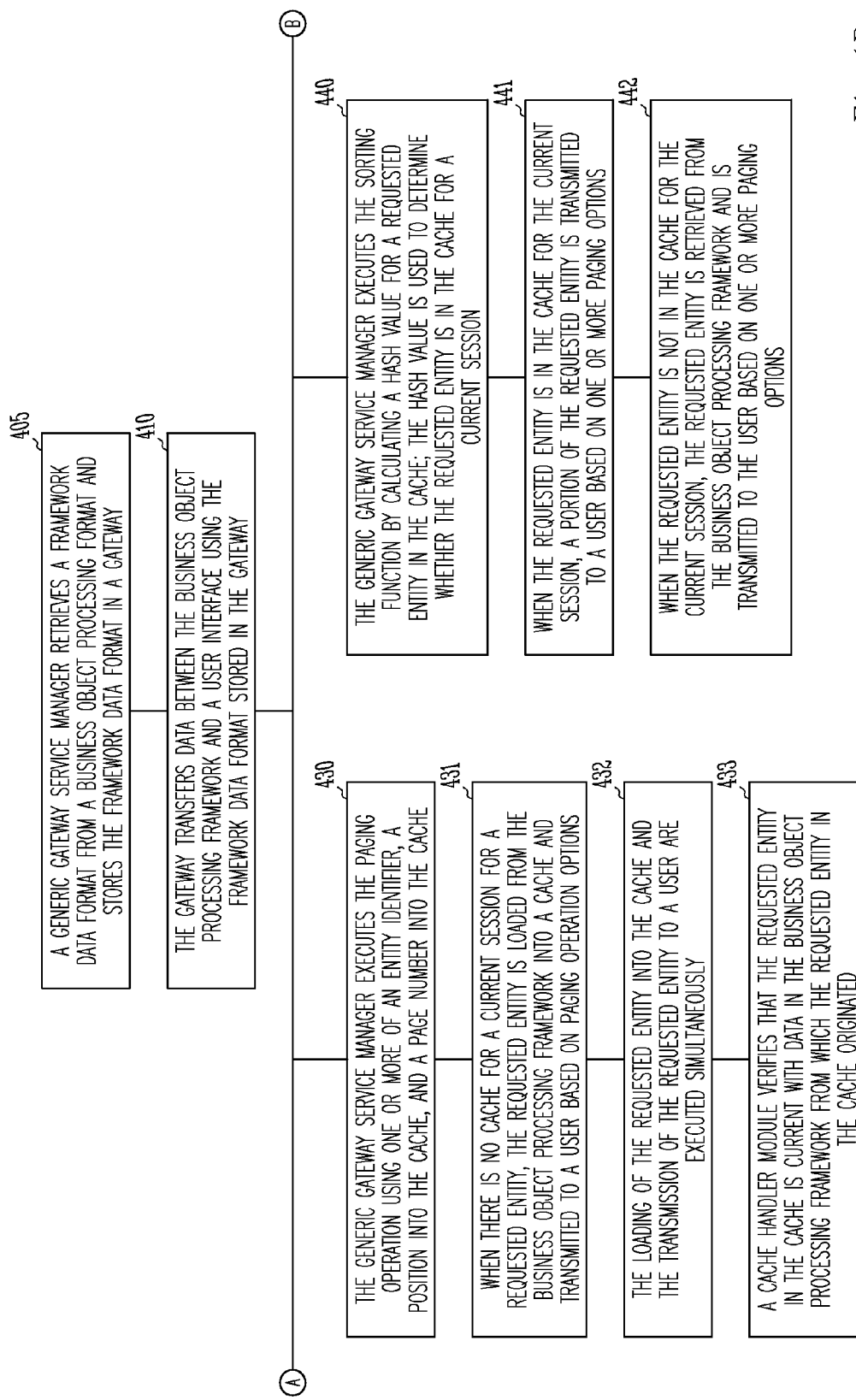
Figure 4C:
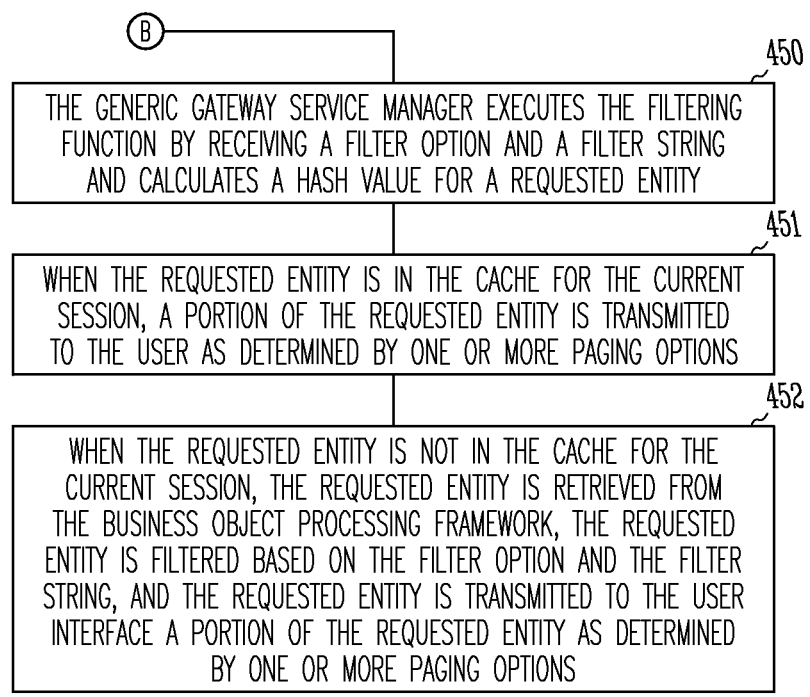

FIGS. 4A, 4B, and 4C are a block diagram illustrating operations and features of a system with a gateway service manager for use with business object applications. FIGS. 4A, 4B, and 4C include a number of feature blocks and operation blocks 405-452. Though arranged substantially serially in the example of FIGS. 4A, 4B, and 4C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 4A, 4B, and 4C, at the highest level of abstraction, at 405, the generic gateway service manager retrieves the framework data format from the business object processing format (in the backend server) and stores the framework data format in the gateway. At 410, the gateway transfers data between the business object processing framework and a user interface using the framework data format stored in the gateway.

Turning now to more details of the system 100, at 415, a data access class module retrieves data from the backend server. At 417, the entity specific data access class module executes a query of a business object in the backend server.

At 420, a cache and a caching operation of the caching module are based on a user session. At 422, a session identifier identifies in the caching operation one or more of a paging operation, a filtering operation, and a sorting operation. A user session is opened when a user logs onto a portal in the system 100. The session is identified with a timestamp and counter, and further associated with a database table in the backend server. In an alternative embodiment, a session identifier is not used. Rather, the portal is considered a stateless application, and session handling is simply not needed.

At 430, in a session-based embodiment, the generic gateway service manager executes the paging operation using one or more of an entity identifier, a position into the cache, and a page number into the cache. The requested entity can be a document or other type or form of data. For example, a requested entity can be an invoice or a request for quotation that is associated with the customer. At 431, it is indicated that in some circumstances there is no cache for a current session for a requested entity. In such a case, the system 100 is operable to load the requested entity from the business object processing framework into the cache 117, and to transmit the requested entity to a user based on paging operation options. At 432, the loading of the requested entity into the cache and the transmission of the requested entity to a user are executed simultaneously. At 433, a cache handler module 118 verifies that the requested entity in the cache is current with data in the business object processing framework from which the requested entity in the cache originated.

At 440, the generic gateway service manager executes the sorting function by calculating a hash value for a requested entity in the cache. The hash value is used to determine whether the requested entity is in the cache for a current session. At 441, in a circumstance where the requested entity is in the cache for the current session, a portion of the requested entity is transmitted to a user based on one or more paging options. At 442, in a circumstance where the requested entity is not in the cache for the current session, the requested entity is retrieved from the business object processing framework and is transmitted to the user based on one or more paging options.

At 450, the generic gateway service manager executes the filtering function by receiving a filter option and a filter string, and calculates a hash value for a requested entity. At 451, in a situation where the requested entity is in the cache for the current session, a portion of the requested entity is transmitted to the user as determined by one or more paging options. At 452, in a situation where the requested entity is not in the cache for the current session, the requested entity is retrieved from the business object processing framework, the requested entity is filtered based on the filter option and the filter string, and the requested entity is transmitted to the user interface a portion of the requested entity as determined by one or more paging options.

Figure 5:
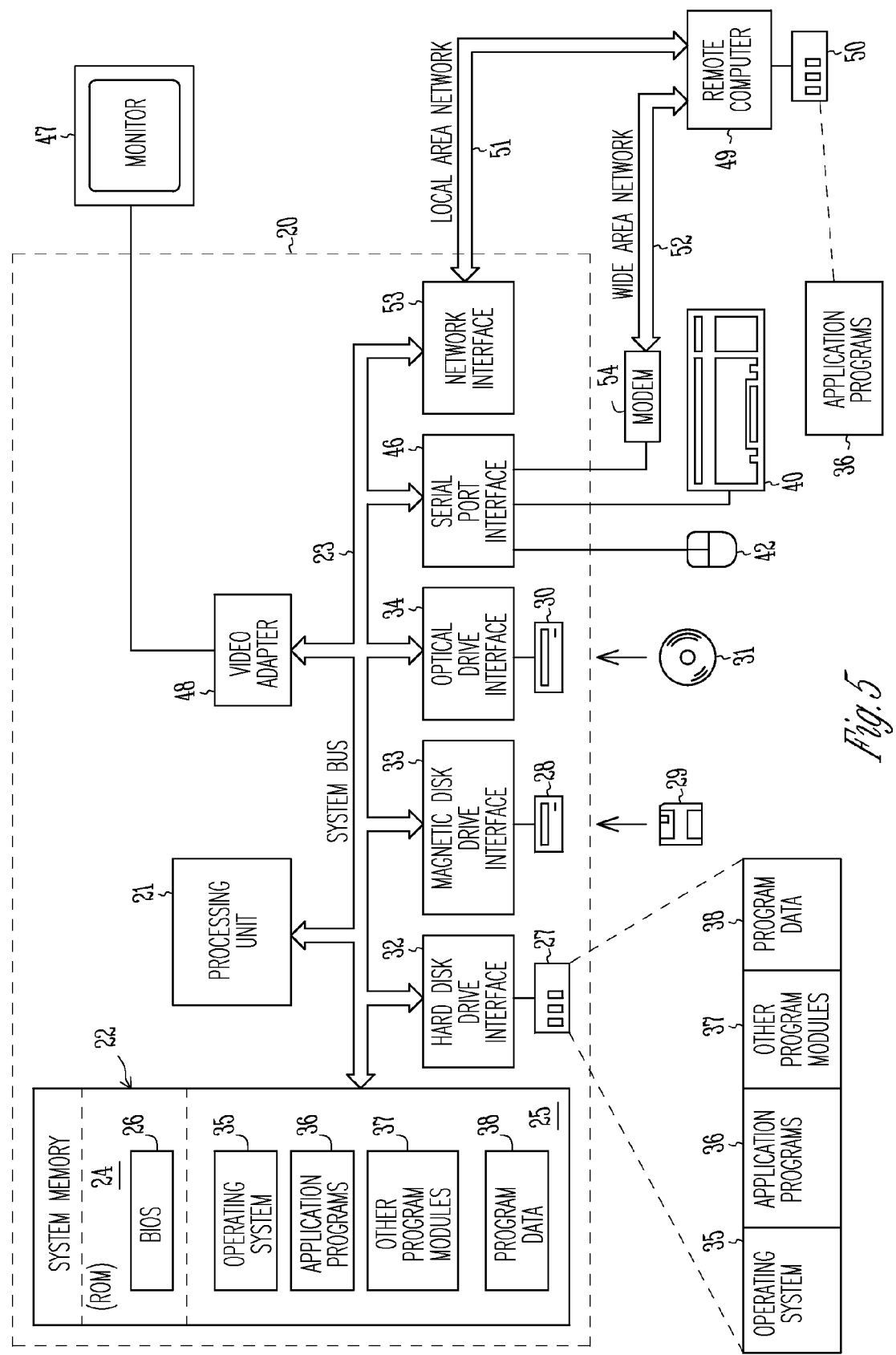
FIG. 5 is a block diagram of a computer system upon which one or more embodiments of the present disclosure can execute.

FIG. 5 is an overview diagram of hardware and an operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote agents shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   a backend server comprising business applications within a business object processing framework (BOPF), the business object processing framework comprising a framework data format;
   a generic gateway service manager coupled to the business object processing framework;
   a gateway coupled to the generic gateway service manager, the gateway comprising a gateway data format;
   a caching module coupled to the backend server, wherein a cache and a caching operation of the caching module are based on a user session; and
   a session identifier that is used to identify in the caching operation one or more of a paging operation, a filtering operation, and a sorting operation;
   wherein the generic gateway service manager is positioned between the business object processing framework and the gateway;
   wherein the generic gateway service manager is configured to retrieve the framework data format from the business object processing format and store the framework data format in the gateway;
   wherein the gateway is configured to transfer data between the business object processing framework and a user interface using the framework data format stored in the gateway;
   wherein the generic gateway service manager executes the sorting operation by calculating a hash value for a requested entity in the cache, and wherein the hash value is used to determine whether the requested entity is in the cache for a current session;
   wherein when the requested entity is in the cache for the current session, transmit a portion of the requested entity as determined by one or more paging options to the user interface; and
   wherein when the requested entity is not in the cache for the current session, retrieve the requested entity from the business object processing framework, and transmit the requested entity as determined by one or more paging options to the user interface.

2. The system of claim 1, comprising an entity specific data access class module in the generic gateway service manager, wherein the data access class module is operable to retrieve data from the backend server.

3. The system of claim 2, wherein the entity specific data access class module executes a query of a business object in the backend server.

4. The system of claim 1, wherein the generic gateway service manager executes the paging operation using one or more of an entity identifier, a position into the cache, and a page number into the cache.

5. The system of claim 4, wherein when there is no cache for a current session for a requested entity, the system is operable to load the requested entity from the business object processing framework into the cache, and to transmit the requested entity to the user interface based on paging operation options.

6. The system of claim 5, wherein the load of the requested entity into the cache and the transmission of the requested entity to a user are executed simultaneously.

7. The system of claim 6, comprising a cache handler module that is operable to verify that the requested entity in the cache is current with data in the business object processing framework from which the requested entity in the cache originated.

8. The system of claim 1, wherein the generic gateway service manager executes the filtering function by receiving a filter option and a filter string, and calculates a hash value for a requested entity;
wherein when the requested entity is in the cache for the current session, transmit to the user interface a portion of the requested entity as determined by one or more paging options; and
wherein when the requested entity is not in the cache for the current session, retrieve the requested entity from the business object processing framework, filter the requested entity based on the filter option and the filter string, and transmit to the user interface a portion of the requested entity as determined by one or more paging options.

9. A process comprising:
retrieving, by a generic gateway service manager, a framework data format from a business object processing format;
storing the framework data format in a gateway;
transferring data between the business object processing framework and a user interface using the framework data format stored in the gateway;
using a session identifier to identify one or more of a paging operation, a filtering operation, and a sorting operation;
executing the paging operation by the generic gateway service manager using one or more of an entity identifier, a position into a cache, and a page number into the cache; and
executing the filtering operation with the generic gateway service manager by receiving a filter option and a filter string and calculating a hash value for a requested entity;
wherein the business object processing framework is installed on a backend server;
wherein the backend server comprises business applications;
wherein the generic gateway service manager is coupled to the business object processing framework;
wherein the gateway is coupled to the generic gateway service manager;
wherein the gateway comprises a gateway data format;
wherein the generic gateway service manager is positioned between the business object processing framework and the gateway;
wherein the cache is coupled to the backend server;
wherein when the requested entity is in the cache for a current session, transmitting to the user interface a portion of the requested entity as determined by one or more paging options;
wherein when the requested entity is not in the cache for the current session, retrieving the requested entity from the business object processing framework, filtering the requested entity based on the filter option and the filter string, and transmitting to the user interface a portion of the requested entity as determined by one or more paging options; and
wherein when there is no cache for the current session for a requested entity, the system is operable to load the requested entity from the business object processing framework into the cache, and to transmit the requested entity to the user interface based on paging operation options.

10. The process of claim 9, comprising:
retrieving data from the backend server using an entity specific data access class module in the generic gateway service manager;
wherein the entity specific data access class module executes a query of a business object in the backend server.

11. The process of claim 9, wherein the load of the requested entity into the cache and the transmission of the requested entity to a user are executed simultaneously.

12. The process of claim 11, comprising verifying that the requested entity in the cache is current with data in the business object processing framework from which the requested entity in the cache originated.

13. The process of claim 9, comprising:
executing the sorting operation with the generic gateway service manager by calculating a hash value for a requested entity in the cache;
using the hash value to determine whether the requested entity is in the cache current session;
wherein when the requested entity is in the cache for the current session, transmitting a portion of the requested entity as determined by one or more paging options to the user interface; and
wherein when the requested entity is not in the cache for the current session, retrieving the requested entity from the business object processing framework, and transmitting the requested entity as determined by one or more paging options to the user interface.

14. A computer readable storage device comprising instructions that when executed by a processor executes a process comprising:
retrieving, by a generic gateway service manager, a framework data format from a business object processing format;
storing the framework data format in a gateway;
transferring data between the business object processing framework and a user interface using the framework data format stored in the gateway;
using a session identifier to identify one or more of a paging operation, a filtering operation, and a sorting operation;
executing the paging operation by the generic gateway service manager using one or more of an entity identifier, a position into a cache, and a page number into the cache; and
executing the sorting operation with the generic gateway service manager by calculating a hash value for a requested entity in the cache; and
using the hash value to determine whether the requested entity is in the cache for a current session;
wherein when the requested entity is in the cache for the current session, transmitting a portion of the requested entity as determined by one or more paging options to the user interface;
wherein when the requested entity is not in the cache for the current session, retrieving the requested entity from the business object processing framework, and transmitting the requested entity as determined by one or more paging options to the user interface
wherein the business object processing framework is installed on a backend server;
wherein the backend server comprises business applications;
wherein the generic gateway service manager is coupled to the business object processing framework;
wherein the gateway is coupled to the generic gateway service manager;
wherein the gateway comprises a gateway data format; and
wherein the generic gateway service manager is positioned between the business object processing framework and the gateway.

\* \* \* \* \*